Feb. 6, 1968        B. BARÉNYI        3,367,711

MULTI-STEP ROOF FOR MOTOR VEHICLES

Filed Jan. 3, 1966

INVENTOR
BÉLA BARÉNYI

BY *Dicke & Craig*

ATTORNEYS

United States Patent Office 3,367,711
Patented Feb. 6, 1968

3,367,711
MULTI-STEP ROOF FOR MOTOR VEHICLES
Béla Barényi, Stuttgart-Vaihingen, Germany, assignor to Daimler-Benz Aktiengesellschaft, Stuttgart-Untertürkheim, Germany
Filed Jan. 3, 1966, Ser. No. 518,336
13 Claims. (Cl. 296—137)

ABSTRACT OF THE DISCLOSURE

A concave roof structure for a motor vehicle, comprising two or more roof portions in a vertically-stacked relationship, wherein a cross-section of the roof structure appears as a step-like configuration from the peripheral portions of the roof in the direction of the center of the roof, each of the load-bearing transverse portions of the roof structure having a concave configuration, wherein a convenient and relatively strong load-supporting surface is provided.

The present invention relates to a concave roof for motor vehicles with step-shaped offsets as viewed in cross section, which are provided with webs extending approximately perpendicularly to the roof surface, especially for passenger motor vehicles.

It is known in a vehicle roof, which is concavely curved in the outer areas, to stamp out an inner also concavely curved roof part which is connected with the outer area by way of webs. These webs extend only along the sides of the vehicle. Such a multi-step, saw-tooth-like concave roof exhibits a greater rigidity compared to a simple roof constructed in a step-less manner over the entire surface thereof.

The present invention aims at a further reinforcement of the roof. The present invention essentially consists in that the step-shaped offsets are constructed as closed rings or at least as nearly closed rings or at least as nearly closed rings and are stamped out of the roof surface in such a manner that the roof is provided with roof portions stacked one above the other and with circumferential webs which connect with each other the individual roof portions. A considerable reinforcement of the entire roof results therefrom because the webs are prevented with such a construction from changing the distance from one another during loading of the centermost roof portion or of one of the center roof portions.

Provision may be made according to a further feature and development of the present invention that the webs are provided with heights varying over the circumference thereof which preferably decrease in the direction toward the longitudinal center. The webs according to a still further advantageous feature of the present invention may be arranged approximately in the manner of an ellipse.

The roof portions may have different radii of curvature as viewed in cross section. Additionally, the roof portions may be constructed as viewed in longitudinal cross section cylindrically or in the shape of a shoehorn.

Accordingly, it is an object of the present invention to provide a vehicle roof of the type described above which offers additional advantages as regards strength and rigidity compared to the prior art devices.

Another object of the present invention resides in a motor vehicle roof of the type described above which is reinforced by simple means to provide considerably greater rigidity.

A further object of the present invention resides in a roof for motor vehicles constructed in the manner of several step-shaped offsets which not only offers greater rigidity but is also capable of supporting thereon greater loads without danger of buckling or deformation.

These and further objects, features, and advantages of the present invention will become more obvious from the following description when taken in connection with the accompanying drawing which shows, for purposes of illustration only, several embodiments in accordance with the present invention, and wherein.

Figure 1:
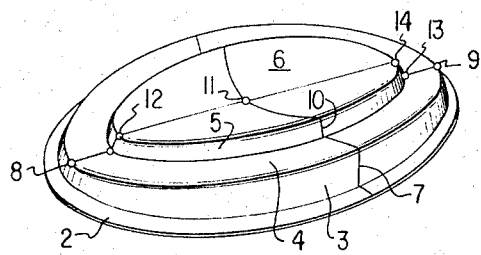
FIGURE 1 is a somewhat schematic perspective view of a first embodiment of a motor vehicle roof in accordance with the present invention.
Figure 2A:
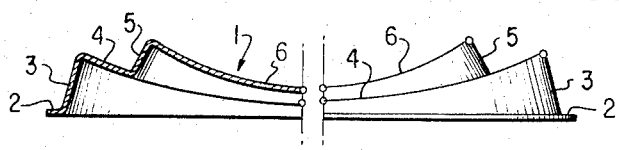
FIGURE 2a is a partial cross-sectional view through the roof of FIGURE 1 in accordance with the present invention taken within the transverse vertical plane including lines 7 and 10, and the other half of the roof being of mirror-image-like construction.
Figure 2B:
FIGURE 2b is a schematic partial end elevational view of the roof of FIGURE 1 in accordance with the present invention, the other half of the roof being of mirror-image-like construction.

Referring now to the drawing wherein like reference numerals are used throughout the various views to designate like parts, and more particularly to FIGURES 1, 2a and 2b, reference numeral 1 generally designates therein one embodiment of a unitary ovally shaped motor vehicle roof which is provided with a lower rim 2 disposed in a horizontal plane, from which extend webs 3 upwardly with a slight inclination in the direction toward the roof center with respect to the vertical. The webs 3 pass over into a part 4 forming the first step of the concave roof. Further webs 5 which are inclined somewhat more strongly than the webs 3 adjoin the part 4. The webs 5 pass over into the center roof part 6 also concavely shaped and forming the second step.

As may be readily seen from FIGURE 1, the height of the lower web 3 varies over the entire circumference and is highest in the center of the lateral walls of the vehicle at 7 whereas the height is smallest at the forward and rearward points 8 and 9 in the longitudinal center. Since both concavely curved roof parts 4 and 6 are curved cylindrically, the height of the web 5 is the same over the entire circumference, i.e., between the lateral line 10 and the points 11 and 12.

In case of loading of at least one of the roof parts from above, the same are loaded in tension and seek to incline the webs more strongly in the angular position thereof. However, this is counteracted by the construction of the webs extending in the illustrated embodiment over the entire circumference approximately in the manner of an ellipse. Consequently, the angles between the webs and the adjoining roof parts cannot change.

Figure 3:
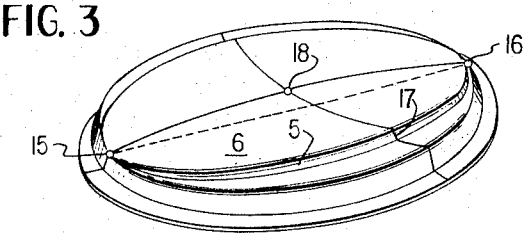
FIGURE 3 is a schematic perspective view of a modified embodiment of a roof in accordance with the present invention.
Figure 4A:
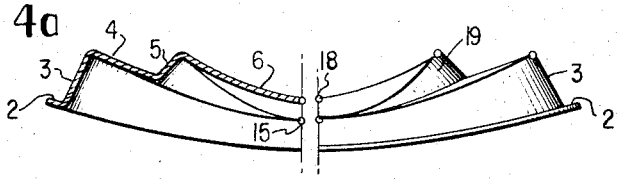
FIGURE 4a is a partial transverse cross-sectional view through the roof of FIGURE 3, the plane of the drawing passing through point 18 and line 17, the other half of the roof being of mirror-image-like construction.
Figure 4B:
FIGURE 4b is a partial schematic elevational view of the roof of FIGURE 3, as viewed from in front or the rear thereof, the other half of the roof being of mirror-image-like construction.

In the embodiment illustrated in FIGURES 3, 4a and 4b, the same reference numerals are used as in connection with the embodiment of FIGURES 1, 2a and 2b to designate similar parts. The embodiment of FIGURES 3, 4a and 4b, however, differs from the embodiment of FIGURES 1, 2a and 2b in that the inner roof part 6 is constructed in the shape of a shoehorn whereas the outer roof part 4 is constructed cylindrically. The lower rim 2 therefore does not lie in a single plane but coincides with a cylindrical surface. Additionally, the roof part 6 extends over the entire length of the roof part 4 so that, on the one hand, by reason of the differing shape of the roof parts 4 and 6, namely, of the cylindrical shape and of the shoehorn shape, respectively, and on the other, by reason of the greater length of the inner roof part 6, the points 8, 11 and 12 and the points 9, 13 and 14 of FIGURES 1, 2a and 2b coincide in the embodiment of FIGURES 3, 4a and 4b at one point 15 and 16, respectively. The webs 5 are, in this embodiment, no longer of uniform height but rather decrease in a wedge-shaped manner from the lateral line 17 in the direction toward the points 15 and 16. Also, these webs 5 represent a considerable reinforcement of the roof.

In the cross-sectional view of FIGURE 4a, the lines which are disposed to the rear of the plane of the cross section have been omitted for reasons of clarity. However, the shoehorn shape is clearly visible from FIGURE 4b, for the highest point of the center roof part 6 lies considerably above the point 15. Also, the wedge-shaped construction 19 of the web 5 is clearly visible from this figure.

Figure 5:
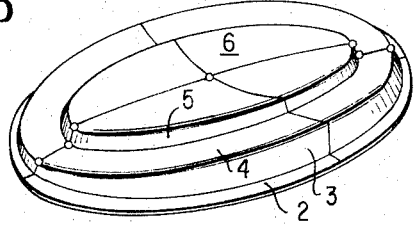
FIGURE 5 is a schematic perspective view of a still further modified embodiment of a roof in accordance with the present invention.

In the embodiment according to FIGURE 5, the same reference numerals are again used to designate similar parts. However, in this embodiment, both roof surface portions 4 and 6 are constructed in a shoehorn like manner and are arranged above a rim 2 disposed in a single plane. Hence, webs 5 of uniform height result between the roof parts 4 and 6 whereas the webs 3 are provided with a height varying over the circumference.

As may be readily seen from the various figures of the drawing, the radii of curvature of the roof parts 4 and 6 are largely different so that the roof parts can be matched to the respective rigidity requirements in relation to their size and also the height location of the individual points of the roof parts can be varied in relation to one another in order that the roof shape can be matched to the requirements as regards headroom, ease of accessibility, and possibly accommodation of auxiliary installations in the spaces below the roof surface.

Even though webs were shown in each of the embodiments, which extend practically over all four sides of the vehicle in the form of an ellipse, the vehicle roof according to the present invention need not possess the shape illustrated in the various figures but may be cut off, for example, at a desired place of the ellipse so that the webs extend only over three sides. The reinforcement is also obtained with such a construction. Furthermore, the relationship in size of the various surfaces may be varied to one another. Additionally, the basic shape of the roof parts need not be round or oval but may be constructed at least partly rectangular as is customary today in motor vehicles.

Thus, while I have shown and described several embodiments in accordance with the present invention, it is understood that the same is not limited thereto but is susceptible of numerous changes and modifications as known to a person skilled in the art; and I therefore do not wish to be limited to the details shown and described herein but intend to cover all such changes as are encompassed by the scope of the appended claims.

I claim:

1. A concave roof structure for a motor vehicle, comprising plural roof portions in a vertically-stacked relationship, said roof structure having a cross-section which appears as a step-like structure from the peripheral portion of the roof toward the approximate center of the roof, the transverse portions of said roof structure having a concave configuration, thereby forming a load-supporting surface, said roof structure being symmetrical about a longitudinal axis.

2. The combination according to claim 1, wherein web portions are provided, said web portions, extending in a direction approximately perpendicular to said concave transverse portions, connecting two successive concave transverse portions and varying in height over the length thereof.

3. The combination according to claim 2, wherein the height of at least one of said web portions decreases from each side of the motor vehicle roof structure in the direction of the longitudinal center of said vehicle.

4. The combination according to claim 2, wherein said web portions are arranged in an approximately elliptical configuration.

5. The combination according to claim 1, wherein said concave transverse portions have different radii of curvature as viewed in cross-section.

6. The combination according to claim 2, wherein said roof structure is arranged in a shoehorn-like configuration, wherein the height of at least one of said web portions decreases from one end of said roof structure in the direction of the other end thereof.

7. The combination according to claim 2, wherein those web portions located above and closer to the center of the roof are disposed at a greater angle from a vertical plane than the web portions located below and at a greater distance from the center of the roof.

8. The combination according to claim 3, wherein said web portions are arranged in an approximately elliptical configuration.

9. The combination according to claim 3, wherein said concave transverse portions have different radii of curvature as viewed in cross-section.

10. The combination according to claim 9, wherein said roof structure is arranged in a shoehorn-like configuration, wherein the height of at least one of said web portions decreases from one end of said roof structure in the direction of the other end thereof.

11. The combination according to claim 3, wherein those web portions located above and closer to the center of the roof are disposed at a greater angle from a vertical plane than the web portions located below and at a greater distance from the center of the roof.

12. The combination according to claim 3, wherein the height of each of said web portions decreases in the direction of the longitudinal center plane of the roof structure.

13. The combination according to claim 12, wherein those web portions located above and closer to the center of the roof are disposed at a greater angle from a vertical plane than the web portions located below and at a greater distance from the center of the roof.

References Cited

UNITED STATES PATENTS 2,813,509  11/1957  Bruno _____ 220—69

FOREIGN PATENTS 611,666  1/1961  Canada.
566,991  9/1957  Italy.

BENJAMIN HERSH, *Primary Examiner.*

C. C. PARSONS, *Assistant Examiner.*